H. O. BLOOM.
Coffee-Polishing Machines.
No. 200,817. Patented March 5, 1878.
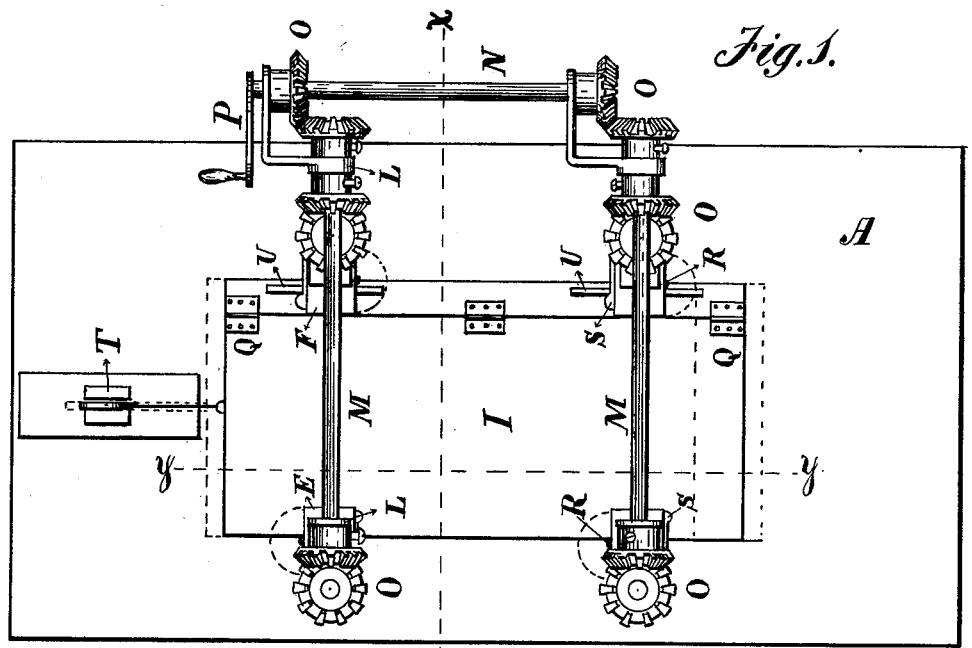
Fig. 1.
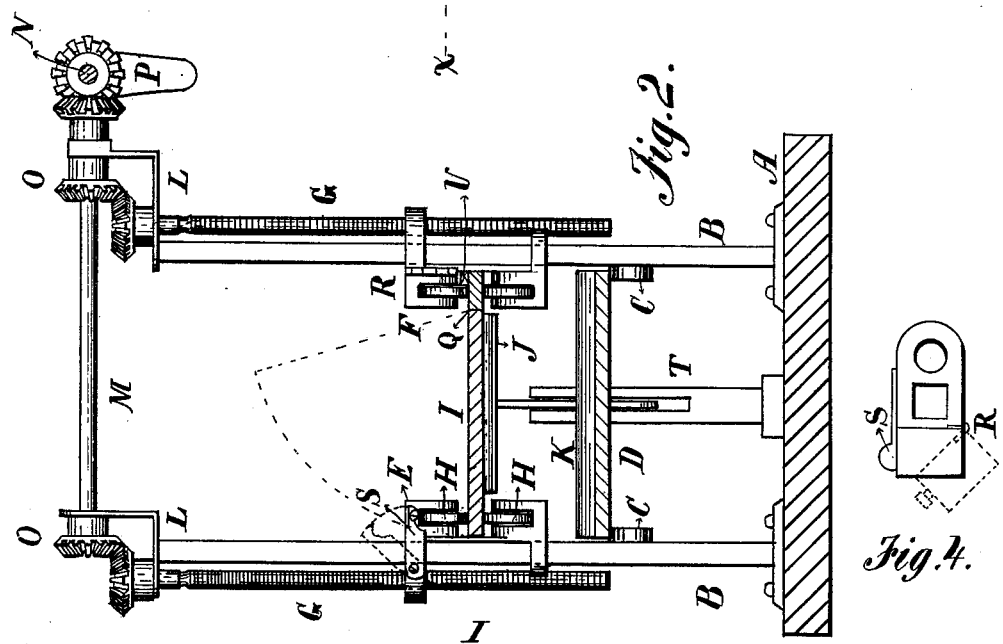
Fig. 2.
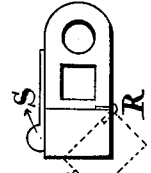
Fig. 4.
Fig. 3.
Attest
W. C. Corlies
L. A. Bunting
Inventor,
Hans Olsen Bloom.
By Coburn & Thacher
Attys.

UNITED STATES PATENT OFFICE.

HANS O. BLOOM, OF CHICAGO, ILLINOIS, ASSIGNOR OF ONE-HALF HIS RIGHT TO JOHN B. RAYMOND, OF SAME PLACE.

IMPROVEMENT IN COFFEE-POLISHING MACHINES.

Specification forming part of Letters Patent No. 200,817, dated March 5, 1878; application filed May 18, 1877.

*To all whom it may concern:*

Be it known that I, HANS OLSEN BLOOM, of Chicago, in the county of Cook and State of Illinois, have invented a new and useful Improvement in Coffee-Polishing Machines, which is fully described in the following specification, reference being had to the accompanying drawings, in which—

Figure 1 is a top or plan view of my invention; Fig. 2, a transverse sectional view at the line *x x*, Fig. 1; Fig. 3, a longitudinal section of one of the rubbing-boards, taken at the line *y y* in Fig. 1; and Fig. 4 is a top view of one of the adjustable roller-blocks.

The object of my invention is to make a machine for rubbing and polishing coffee; and my invention consists in the mechanisms hereinafter set forth and specified.

In the accompanying drawings, A represents the base of the machine, and B are vertical standards. I attach to these standards four rollers, C, suitable for carrying one of the rubbing-plates. D is a plate or platform, with its edges resting upon the rollers C. E and F are movable blocks passing around the standards B, and provided with screw-threads to engage with the long screws G. These blocks carry rollers H. I is a hinged plate or platform, which runs between the rollers H. J are cross-cleats, securely fastened to the under side of the plate I. Their shape is clearly shown in Fig. 3. K are similar cross-cleats, attached to the upper surface of the plate D.

The long screws G have bearings L, and are driven simultaneously and uniformly by the shafts M N and bevel-gearing O from the crank P. By turning the long screws G, the plate I is raised or lowered by the sliding of the blocks E and F up or down on the standards B, and the space between the plates I and D is increased or diminished accordingly.

The plate I is made in two parts, which are hinged together by hinges Q, and the blocks F are made in two parts, hinged together by hinges R, Fig. 4. S are latches for holding the blocks closed when the plate I is in position for operation. T is a standard, in which is pivoted a vibrating lever, from one end of which a pitman is connected to the plate I, and from the other end of which a pitman is connected to the plate D. Power is applied to this vibrating lever for communicating reciprocating motion to the plates.

The operation of the machine is as follows: Two of the blocks F are swung open on their hinges, as shown by the dotted lines in Fig. 4, and the plate I swung up, as shown by dotted lines in Fig. 2. When bags of coffee are placed upon the plate D, the plate I is swung down into position and the roller-box F closed over it. The pressure of the upper plate I upon the bags of coffee is regulated by turning the long screws G, as above described. Power is then applied to the machine, when the plates D and I are put in motion, rubbing the coffee between them, making upon the surface of the kernels a friction that cleans and polishes them.

Substantially the same result could be accomplished by a cast corrugated surface that is produced by the cleats attached to the plates D and I. It is necessary to have an uneven surface pressing upon each side of a bag of coffee, and reciprocated back and forth in the manner above described.

U are short cleats attached to the upper surface at one edge of the plate I, to hold it in place while it is being opened and closed, to insert and remove the coffee.

I am able by this machine to thoroughly clean and polish coffee rapidly and at slight expense.

Having thus fully described the nature and operation of my invention, what I claim as new, and desire to secure by Letters Patent, is—

1. The standards B, in combination with the corrugated plate D, supported on stationary rollers, the similar plate I, supported above the former on rollers adjustable vertically, and mechanism for reciprocating said plates, substantially as and for the purpose set forth.

2. The standards B, in combination with the plate I and adjustable roller-blocks E and F, for supporting and adjusting the plate, substantially as and for the purpose set forth.

3. The plate I, provided with an uneven under surface, and made in two parts, connected together by hinges Q, in combination with the hinge-block F, substantially as and for the purpose set forth.

4. The long screws G, in combination with the supporting-standards, the blocks E and F, and the plate I, whereby the plate is adjusted vertically and its pressure upon the coffee regulated, substantially as described.

HANS OLSEN BLOOM.

Witnesses:
 L. A. BUNTING,
 W. C. CORLIES.